83-108 SR

F286D OR 3,610,082

[redacted] [redacted] [redacted]

INVENTORS
MICHAEL RIGGI
MAXIMILLIAAN BRUCKNER

By George C. Sullivan

INVENTORS
MICHAEL RIGGI
MAXIMILLIAAN BRUCKNER
By George C. Sullivan
Agent

INVENTORS
MICHAEL RIGGI
MAXIMILLIAAN BRUCKNER
By George C. Sullivan
Agent

TAPE CORE PRESS

INVENTORS
MICHAEL RIGGI
MAXIMILLIAAN BRUCKNER
By George C. Sullivan
Agent 3,610,082
Patented Oct. 5, 1971

3,610,082

TAPE CORE PRESS

Michael Riggi, Downey, and Maximiliaan Bruckner, Compton, Calif., assignors to Lockheed Aircraft Corporation, Burbank, Calif.

Filed Feb. 16, 1970, Ser. No. 11,576
Int. Cl. B26f *1/02*
U.S. Cl. 83—108 5 Claims

ABSTRACT OF THE DISCLOSURE

A press for punching memory cores from a ferrite impregnated tape wherein the core center is first removed from one side of the tape and in a continuous motion the core is removed from the other direction. The core is returned to its position in the tape and the tape advances to a new position.

Recently, new techniques for production of toroidal cores for magnetic memories have been introduced. One technique is described in an article by W. Wiechec "New Technologies for Production of Ferrite Cores," IEEE Transactions on Magnetics, vol. MAG-4, No. 3, September 1968. Ferrite powder is incorporated into sheets using a plastic binder, and the cores are punched from the sheets. The cores are then fired in the usual manner.

The advantages of the new technique are believed apparent, such as higher yields and lower costs. Even so, problems and disadvantages still exist with the current state of the art. Considerable down time results from grinding bushings, core rods and punches. Adjustments for height and weight of the core are necessary. Some cores are eccentric or lack uniform density. Furthermore, highly skilled operators are required.

The foregoing problems and disadvantages are reduced or eliminated by the present invention which comprises a holder for a plurality of core rods, first and second holders for a plurality of core punches, said core rods and the punches in the first holder being coaxially aligned, and the punches in the second holder being axially aligned with the punches in the first holder, a ferrite powder impregnated tape positioned between the two holders, means for driving the holders.

Accordingly, an object of the invention is to provide a tape core stamping press which produces more uniform cores with higher yields and lower costs.

Another object of the invention is to provide a stamping press which eliminates the need for highly skilled operators.

A further object of the invention is to provide a stamping press which has provisions to facilitate grinding of bushings, core rods and punches.

These and other objects will become more apparent from the following detail description when taken with the drawings in which.

Figure 1:
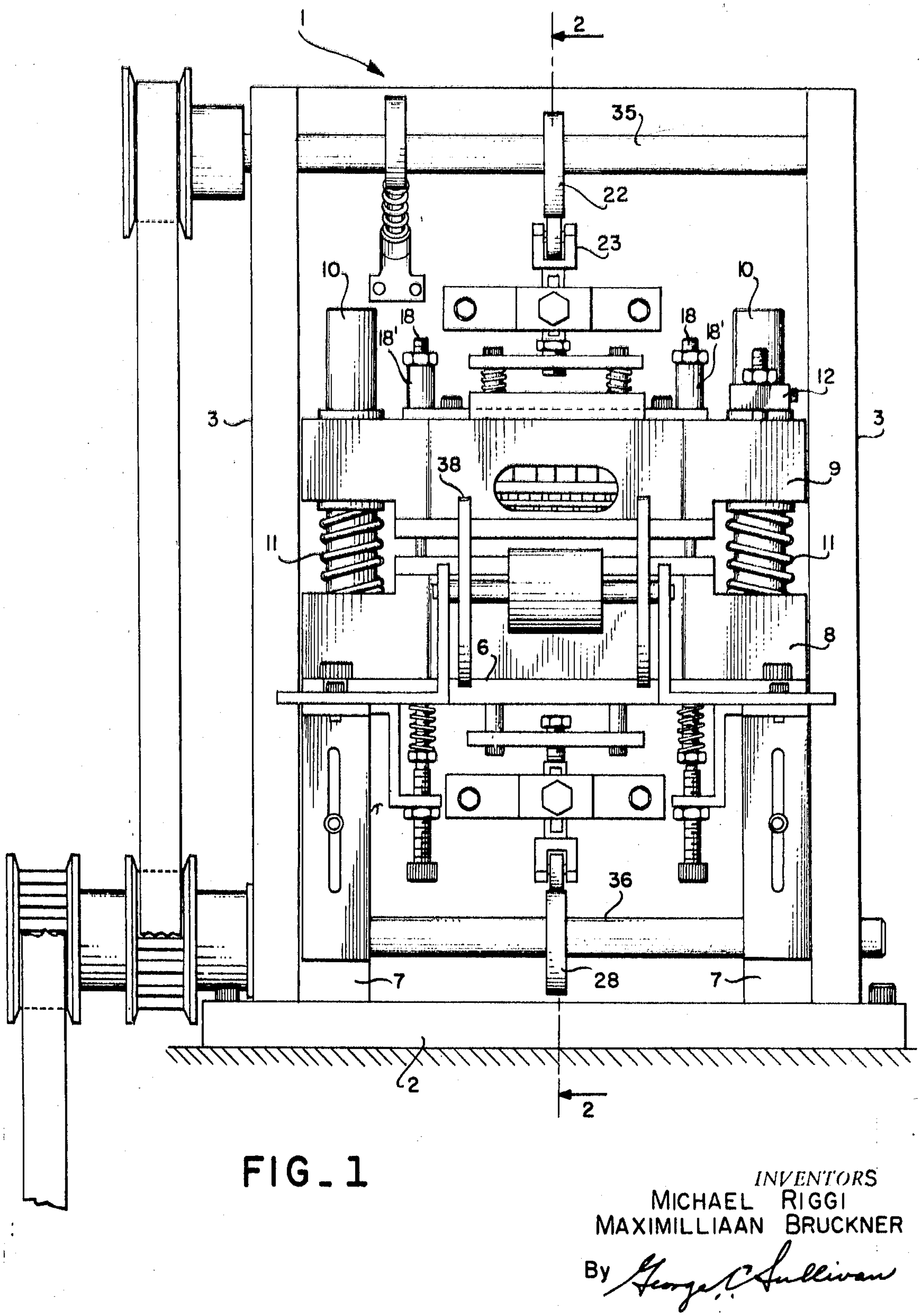
FIG. 1 is a front view in elevation of a stamping press embodying the invention.
Figures 2, 8:
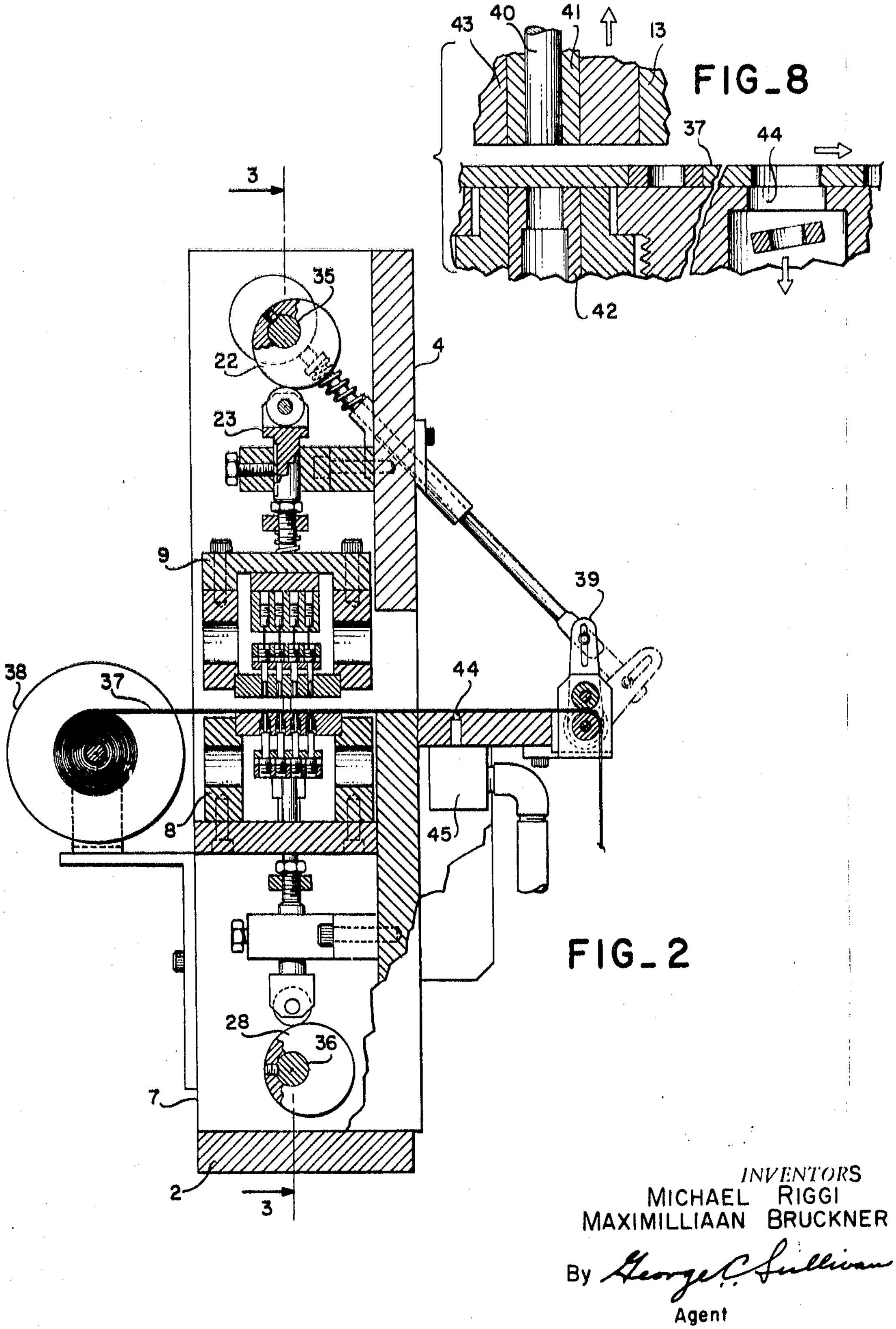
FIG. 2 is a cross section in elevation taken along the line 2—2 in FIG. 1.
FIGS. 4, 5, 6, 7, 8 are enlarged cross sectional views of the core rod and punches illustrating the steps of operation of the invention.
Figure 3:
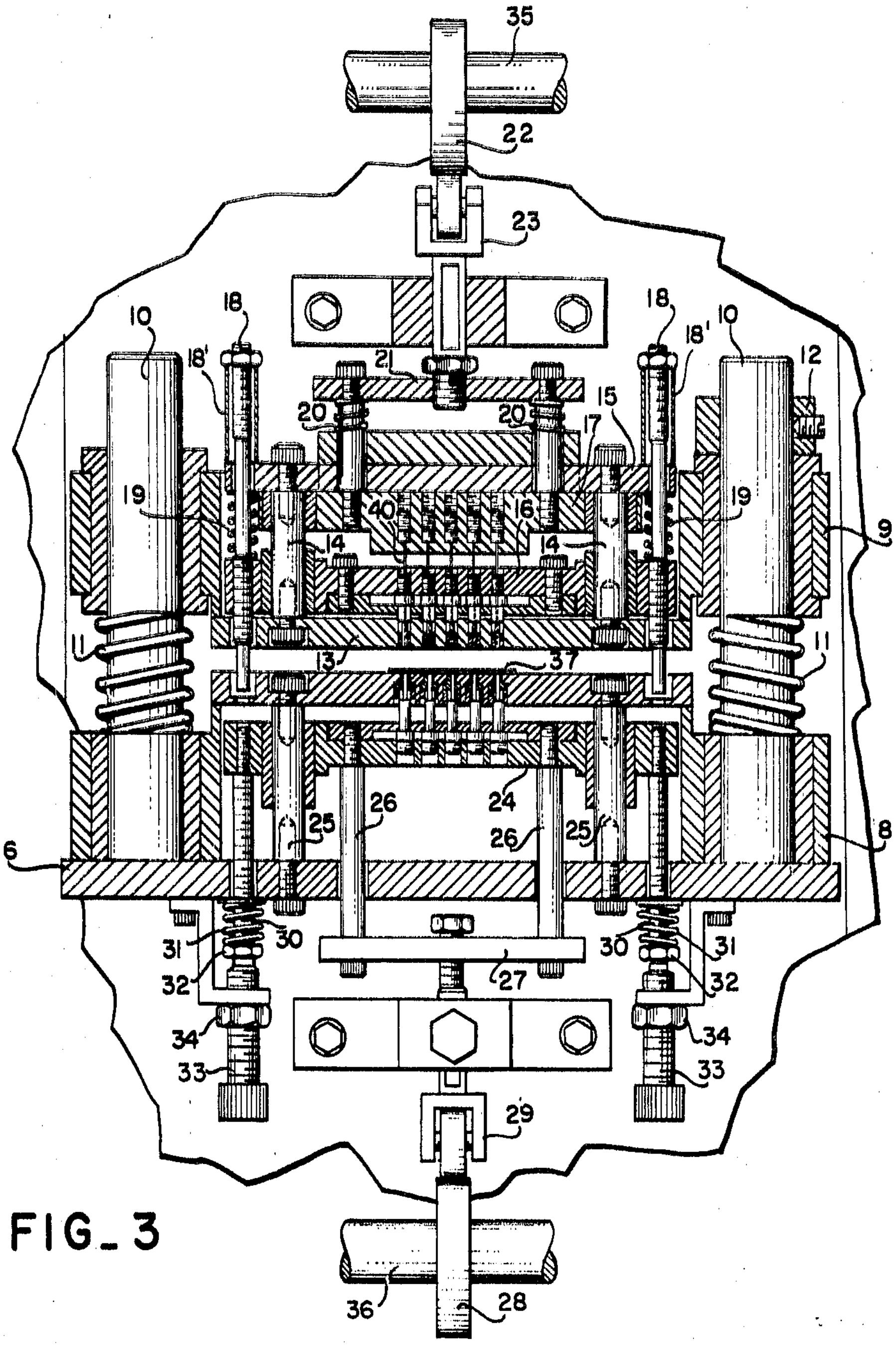
FIG. 3 is an enlarged partial cross sectional view in elevation taken along the line 3—3 in FIG. 2.

Referring now to FIGS. 1, 2, and 3, the press body generally designated 1 consists of a base plate 2, two side plates 3, upper body plate 4 and lower body plate 5. A bottom press plate 6 rests on a pair of supports 7. A lower press platen 8 is attached to plate 6, and an upper press platen 9 is positioned on a pair of guides 10 which are joined to the lower platen in a press-fit. Springs 11 urge the platens apart. A retainer ring 12 limits the upward motion of platen 9. Tool holder plate 13 is attached to platen 9 by suitable means (not shown). Spaced therefrom by means of the guides 14 is an end tool holder strip 15. Mounted on the guides are a core punch holder 16 and a core rod holder 17. Adjusting rods 18 are threaded through the core punch holder 16 and project through the end strip 15. Spacers 18 surround the rods. Springs 19 urge the core punch holder toward the tool holder plate 13. Push rods 20 are attached to the core rod holder, pass up through the end strip 15, and are joined by means of the upper platen push plate 21. The upper platen is driven by the upper eccentric cam 22 and follower 23.

The lower platen is provided with a core punch holder 24 which is positioned on the guides 25. The drive means is similar to that of the upper platen and consists of the push rods 26, push plate 27, eccentric cam 28 and follower 29. A pair of rods 30 are threaded into punch holder 24 and pass through the bottom press plate 6. A pair of return springs 31 are held in place by nuts 32. Adjustable stop screws 33 are provided to set the position of the punch holder 24. The two eccentric cams 22 and 28 are mounted on shafts 35 and 36, respectively, and the latter are driven by any suitable means such as the pulley and belt arrangement. The tape 37 is loaded on a reel 38 and advanced between the upper and lower platens by means of an intermittent motion device such as indicated at 39.

A plurality of core rods 40 are retained in the rod holder 17 (best seen in FIG. 4), and a plurality of core punches 41 are retained in the upper punch holder 16. Similarly, a plurality of core punches 42 are retained in the lower punch holder 24. It should be noted that the rods and punches are rigidly held in place in the holders in a group (in this case 20—4 rows of 5 each), and can be readily removed from the platen bodies and honed as a unit.

Figures 4, 5, 6, 7:
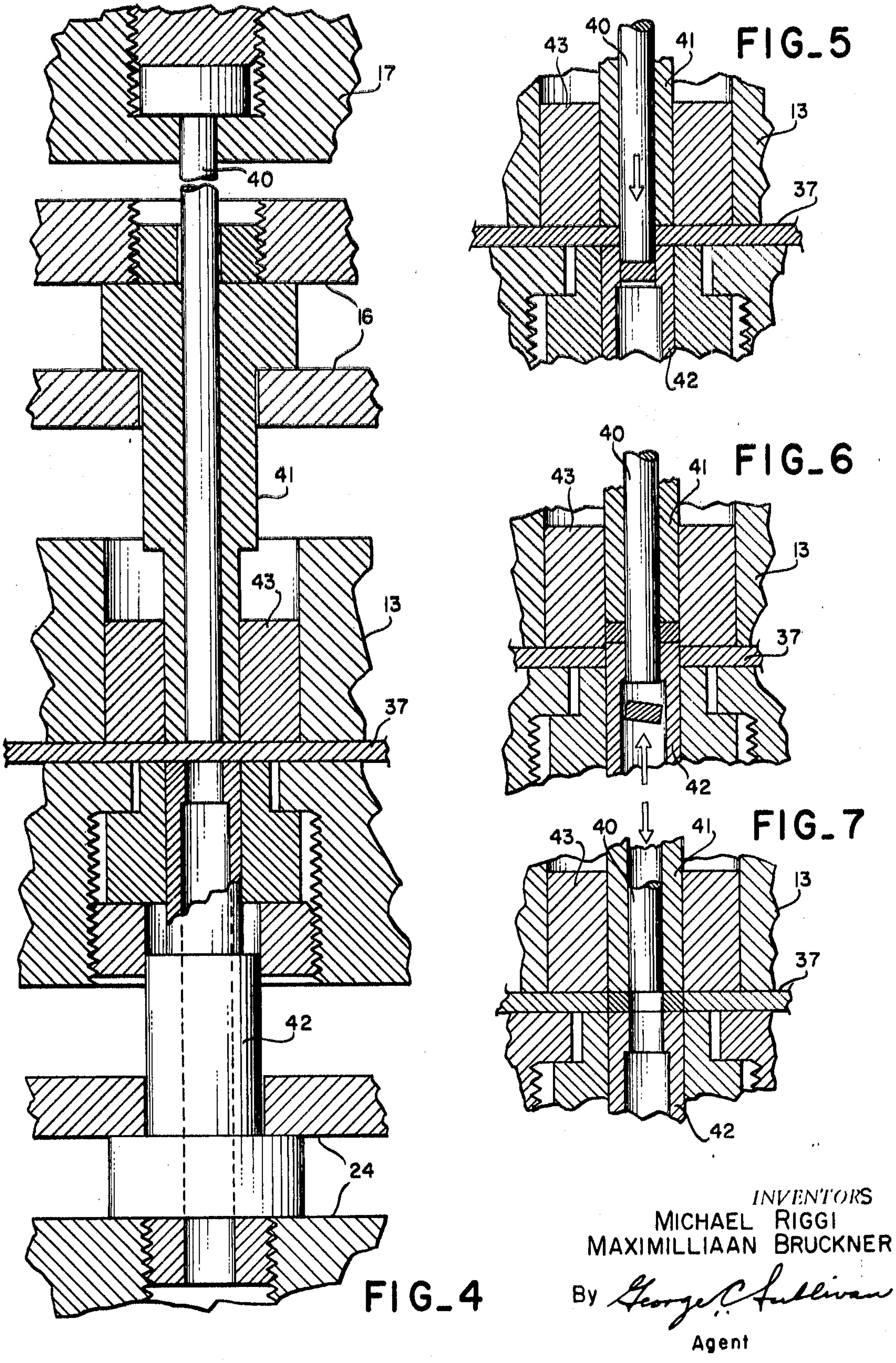

In FIG. 4, the upper and lower core punches and the core rod are seen in their respective positions prior to cutting out of the core. Adjustment of the rods 18 (FIG. 3) so that they are in contact with the lower core holder 24 will maintain the spacing between punches 41 and 42. The core rod 40 cuts out the center against the inside edge of the core punch 42. Next (FIG. 6), the lower core punch 42 moves up, and, as recalled, the rods 18 are in contact with the holder 24, so the upper punch moves also and the outer diameter of the core is cut against the die 43. In FIG. 7, the punches return to the original position and the core rod is withdrawn. It will be noted that the core is returned to its position in the tape. The upper platen is raised and the tape advances to the next position, and the foregoing steps are repeated. The cores may be removed from the tape in any convenient manner. As shown in FIGS. 2 and 8, an aperture beneath the tape may be connected to a source of vacuum (not shown) and cores are removed from the tape by suction and fall into a suitable container 45.

The rods are adjusted in association with the spacer so that the upper core punches are flush with the face of tool holder plate 13. It will also be noted that adjustment of the rods 18, as mentioned above, keeps the punches spaced apart the thickness of the tape and permits uniform pressure on the cores, thus avoiding the problem of uneven heights and varying densities.

We claim:

1. A tape core press comprising a plurality of core rods, a first plurality of core punches coaxially surrounding said rods, a second plurality of core punches in axial alignment with said first plurality of punches, means for adjusting the distance between the first and second plurality of punches, a ferrite impregnated tape positioned between the first and second plurality of punches, means driving the core rods through the tape and into the second plurality of punches to remove the core center, a plurality of dies positioned around the first plurality of punches, and means for driving the second plurality of punches through the tape and into said plurality of dies to remove the core from the tape.

2. A tape core press as defined in claim 1, wherein said core rods and punches are mounted in holders.

3. A tape core press as defined in claim 1, and further including means for intermittently moving the tape.

4. A tape core press as defined in claim 2, and wherein the adjusting means is attached to one punch holder and positions the other punch holder.

5. A tape core press as defined in claim 2, wherein said holders are removable from the press.

References Cited

UNITED STATES PATENTS

| | | | |
|---|---|---|---|
| 456,440 | 7/1891 | Shimer | 83—623 X |
| 2,584,168 | 2/1952 | Sutowski | 83—621 X |

JAMES M. MEISTER, Primary Examiner

U.S. Cl. X.R.

83—519, 527, 623